United States Patent [19]

Scantland et al.

[11] Patent Number: 4,921,412
[45] Date of Patent: May 1, 1990

[54] TIRE CURING PRESS

[75] Inventors: Joe F. Scantland, Akron; Frederick J. Huffman, Tallmadge, both of Ohio

[73] Assignee: Scantland Industries, Inc., Copley, Ohio

[21] Appl. No.: 255,591

[22] Filed: Oct. 11, 1988

[51] Int. Cl.$^5$ .............................................. B29C 35/02
[52] U.S. Cl. ................................... 425/28.1; 425/193
[58] Field of Search ................... 425/28.1, 35, 36, 38, 425/43, 44, 48, 51, 52, 58, 451.9, 192 R, 185, 193, 195

[56] References Cited

U.S. PATENT DOCUMENTS

| | | | |
|---|---|---|---|
| 3,184,794 | 5/1965 | Sherkin | 425/44 X |
| 3,659,975 | 5/1972 | Leblond | 425/36 |
| 3,751,189 | 8/1973 | Magerle | 425/193 X |
| 4,022,554 | 5/1977 | MacMillan | 425/36 X |
| 4,293,293 | 10/1981 | MacMillan | 425/52 X |
| 4,351,789 | 9/1982 | Sidles et al. | 425/28.1 X |
| 4,580,959 | 4/1986 | Pizzorno et al. | 425/28.1 X |
| 4,631,014 | 12/1986 | Drewel et al. | 425/451.9 X |
| 4,684,101 | 8/1987 | Wagner et al. | 425/192 R X |
| 4,737,093 | 4/1988 | Hori et al. | 425/192 R X |

Primary Examiner—Richard L. Chiesa
Attorney, Agent, or Firm—Oldham & Oldham Co.

[57] ABSTRACT

A pair of parallel supports or uprights have upper and lower mold platens slidably mounted thereon and an annular piston is provided for moving the lower platen upwardly for mold closing action with stop means being provided for the upper mold platen to obtain a movable mold platen and accurate register for simplified, accurate mold closing and opening actions. A multi-cylinder center post assembly is provided to engage the tire curing bladder at its upper and lower ends and provide improved control action therefore during tire curing cycles.

4 Claims, 6 Drawing Sheets

TIRE CURING PRESS

BACKGROUND OF THE INVENTION

Heretofore there have been many different types of tire curing press provided with the primary style of a tire curing press comprising a top and bottom mold enclosure section and tire curing mold portions being provided in the top and bottom enclosure members and being controlled by toggle members to provide for mold opening and closing action. In these prior art tire curing presses, it has been difficult to obtain accurate alignment of upper and lower mold sections to provide positive, accurate sizing of the mold when closed for tire cure action. Also, portions of the mold sections can wear to provide further difficulties for accurate register and sizing of tire molds.

A general object of the present invention is to provide improved tire mold positioning apparatus wherein mold sections are positioned by accurately controlled slide means engaging a pair of upright support posts, the apparatus being adapted to provide convenient, accurate, repetitive mold register and accurately sized tire mold means for tire cure action.

Another object of the invention is to provide a new lock and positioning means for a mold platen so that the platen can be accurately held against vertical movement and a mold portion can be readily engaged with a mold section positioned by the mold platen and upward movement of the upper mold platen is impossible when locked in operative tire cure position.

Another object of the invention is to provide a novel annular ram for pressurizing tire molds where as the area of the annular ring is greater than the area of tire being cured so that the differential pressure will maintain the mold in a closed position, and a novel, readily removable lock means for engaging support posts and controlling the uppermost position thereof during tire cure action.

Still other objects of the invention are to provide a new and improved multi-cylinder post means and controls for engaging the beads of a tire shaping bladder and effectively moving the bladder before and after a cure cycle; to provide a novel combination of an annular ram for controlling the vertical position and closing action of a lower mold half and to provide a strong, accurate top stop to limit the position of the press head in the tire cure press.

The foregoing and other objects and advantages of the invention will be made more apparent as the specification proceeds.

BRIEF DESCRIPTION OF THE DRAWINGS

Reference now is made to the accompanying drawing, wherein.

When referring to corresponding members shown in the drawings and referred to in the specification, corresponding numerals to facilitate comparison therebetween will be used.

BEST MOST FOR CARRYING OUT THE INVENTION

Figure 1:
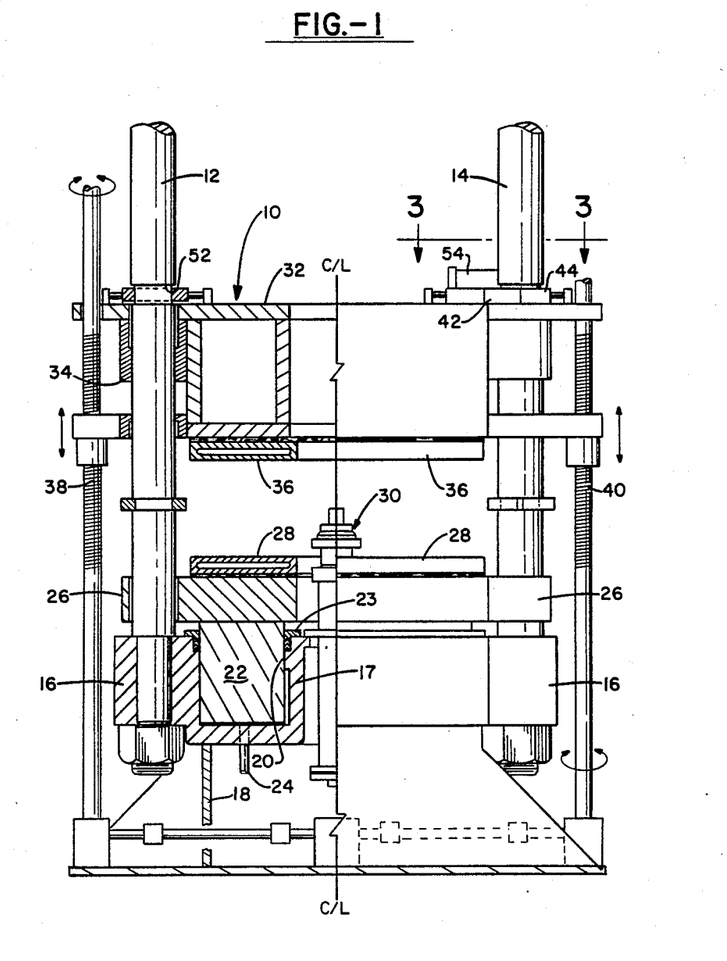
FIG. 1 is a fragmentary vertical section of a tire curing press embodying the invention with a portion thereof being shown in vertical section.
Figure 2:
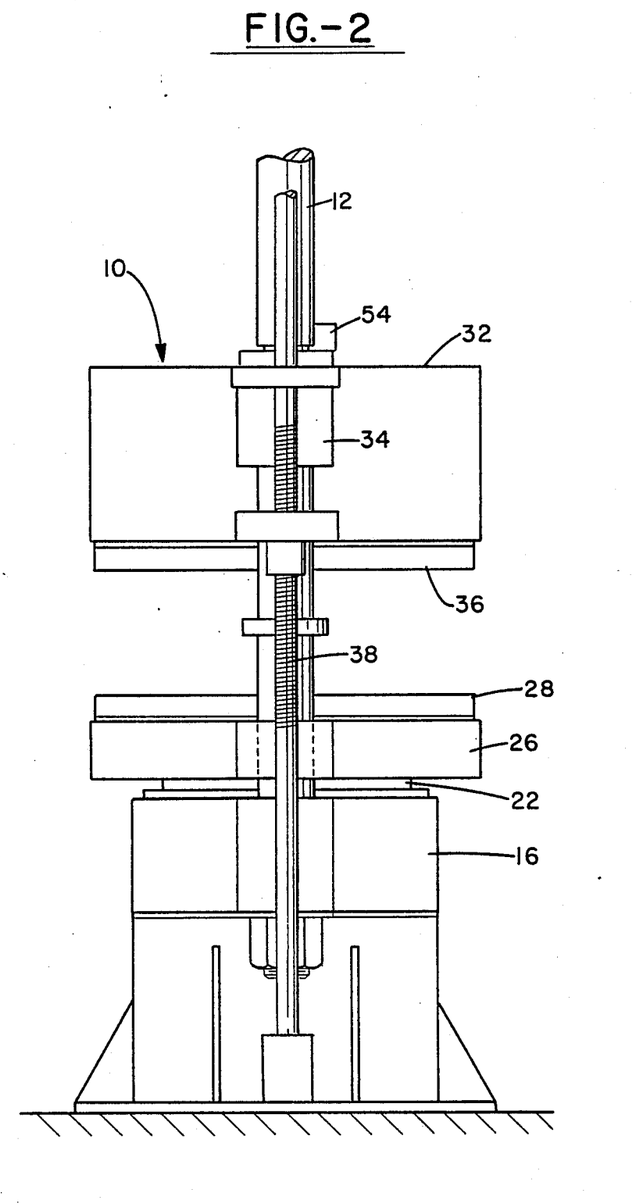
FIG. 2 is a side elevation of the press of FIG. 1.

Referring now to the details of the structure shown in the drawings, a tire curing press is indicated as a whole by the numeral 10. This press 10 includes a pair of upright support posts 12 and 14 that are secured to a suitable positioning means such as a base plate 16, having a center hole 17 therein, that is carried on a support 18 to elevate the base plate above the supporting floor surface and to form a base means for the tire curing press. This base plate 16 has a top annular recess or cylinder 20 provided therein and an annular piston 22 is slidably positioned in such annular cylinder 20, which piston extends above or protrudes from the upper surface of the base plate 16. Any suitable packing means 23 are associated with the piston 22 to prevent leakage of pressure liquid from the pressure cylinder portion of the cylinder 20. A fluid pressure supply means is indicated at 24 to supply pressure liquid to the actual lower end of the annular piston 22 at the space indicated by line A. Sufficient clearance is provided at the bottom of the piston 22 to enable the fluid pressure supplied to raise the piston. The upper end of the piston 22 is suitably secured to a lower platen 26 that in turn is slidably positioned on and extends between the two support posts 12 and 14. The lower platen 26 has a suitable steam heater chest 28 carried by its upper surface and suitably connected to steam supply means (not shown) for providing heat to aid in curing any tire positioned in the press. Both the base plate 16 and the lower platen 26 have center apertures therein and a multi-cylinder and piston power supply assembly indicated as a whole by the numeral 30 is suitably fixedly positioned in this base portion of the tire curing press 10 in the center apertures of the lower platen and base plate, and such assembly extends up vertically beyond the lower platen 26.

An important feature of the invention is that the total surface area of the annular piston 22 contacting the platen is greater than the surface area of the largest tire to be cured. Since the same fluid pressure is being applied to the piston and the tire, should a leak occur in the tire, the pressure of the piston would override tending to close the platen rather than causing the platen to be forced open, which would create a safety hazard.

The tire curing press also has an upper platen 32 and it is slidably secured to the support posts 12 and 14 in any conventional manner such as by suitable bushings 34. A conventional mold section can be secured in any desired manner to a steam heating chamber member 36 operatively carried by the lower surface of the upper platen 32. The vertical position of the upper platen 32 is controlled as by a pair of ball screws 38 and 40 that engage with the upper platen to move it vertically of the support posts 12 and 14 as when a cured tire is to be removed from the press. Mold opening action can be provided by lowering the lower mold platen 26 and any mold section secured thereto, as hereinafter described.

Figure 3:
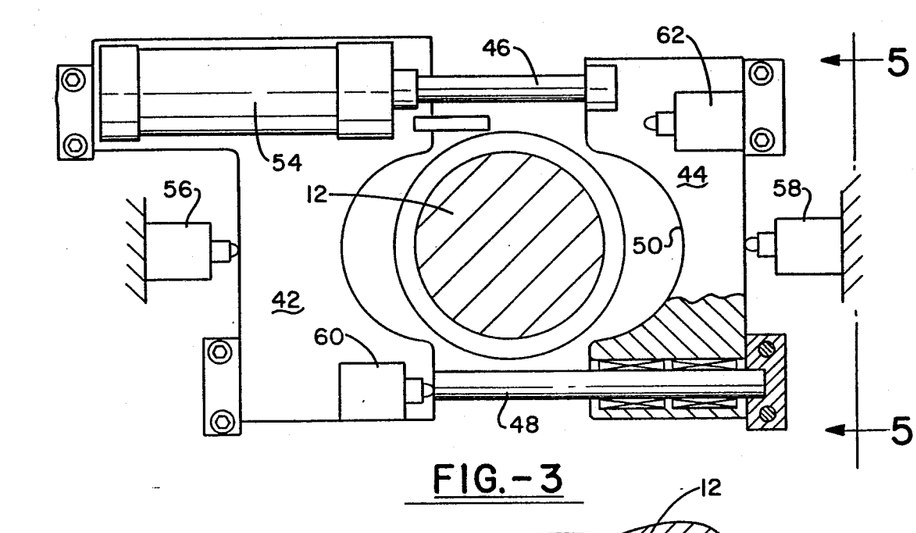
FIG. 3 is a horizontal section taken on line 3—3 of FIG. 1 showing a support post and its assembled lock means.
Figure 4:
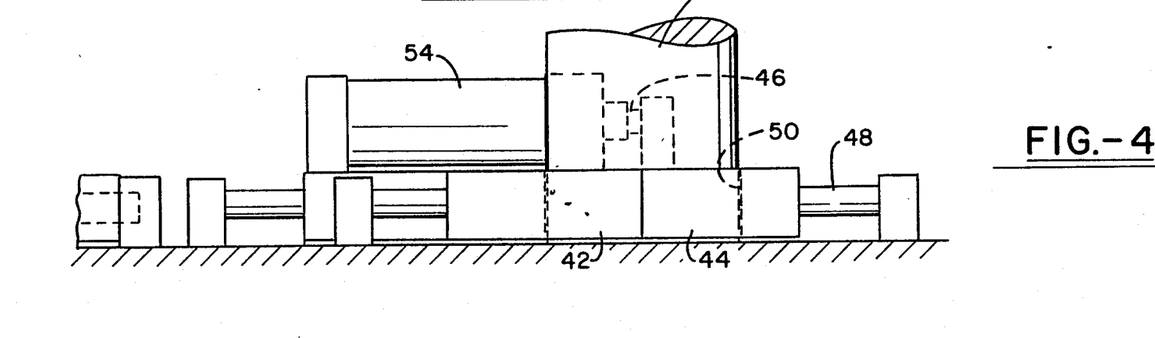
FIG. 4 is a front elevation of the apparatus of FIG. 3 when in a locked position.
Figure 5:
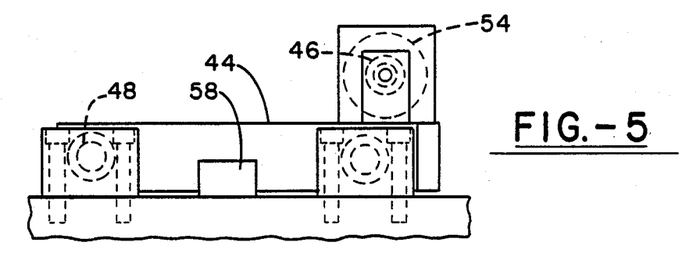
FIG. 5 is a fragmentary section taken on line 5—5 of FIG. 3.

In order to provide a convenient apparatus to insure effective mold alignment and good mold closing action, there are provided removable lock members operatively engaged with the support posts for preventing upward movement of the upper platen 32 by the power cylinders provided. These lock members are best shown in FIGS. 3, 4 and 5 and a pair of slide lock plates 42 and 44 are shown positioned on opposite sides of the support post 12 and such slide lock plates slidably engage a pair of mounting rods 46 and 48 so that two of the rods engage the individual plates at widely separate locations to facilitate obtaining good parallel sliding movement of the one lock plate or of the two lock plates in relation to each other and to maintain the slide lock plates in the same horizontal plane. The slide lock plates are each provided with an arcuate recess 50 in adjacent inner faces thereof and these recesses are complementary to each other and are sized to engage with the support post 12 at an annular groove 52 provided therein at a location immediately above the upper mold platen 32 when it is in its normal operative position for mold closing action. The slide lock plates 42 and 44 are moved with relationship to each other by a power cylinder 54 that has a piston (not shown) extending therefrom and is engaged with the slide lock plate 44. The cylinder 54 itself being secured to the slide lock plate 42 whereby relative movement of these plates can be provided by a power stroke of the piston rod (not shown).

For safety and control purposes, suitable operating switches or fail-safe devices can be positioned in operative association with the slide-lock plates 42 and 44 to enable operation thereof only under controlled conditions at suitable time intervals. Thus, control switches 56 and 58 are suitably mounted on the upper platen 32 in proper spaced relationship to each other whereby when the slide-lock plates are in their completely released or inoperative positions the switches can be closed to enable other press operations to occur. Likewise, additional control switches 60 and 62 can be mounted directly on the plates themselves for contacting opposed areas of the slide-lock plates when they are moved into operative association with each other so that such control switches likewise need to be opened or closed as the circuit control conditions require for continued operation of the tire curing press for a tire curing cycle.

Multi-Cylinder and Piston Power Supply Assembly

Figure 6:
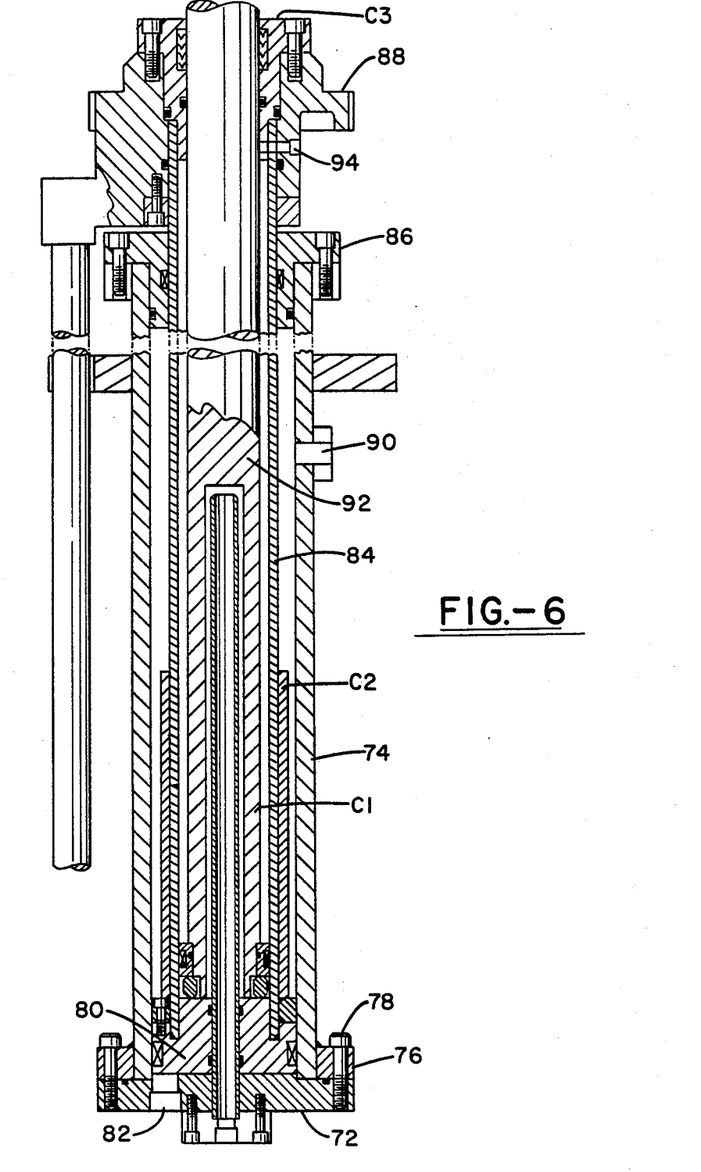
FIG. 6 is a vertical section, partially broken away, of the multi-cylinder and piston assembly forming a pot means in the tire curing press of FIG. 1.

A power actuation member comprising a multi-cylinder and piston assembly generally indicated by the numeral 70 is shown in section in FIG. 6 and it is an enlargement and section of the power supply assembly 30. It is provided for controlling the action of the bladder that is positioned inside a tire carcass for controlling inflation and shaping of the tire during and after the cure cycle. The assembly 70 is more complete than the assembly 30 shown in FIG. 1. This multi-cylinder and piston assembly 70 may also be called a bladder position and control member and it comprises a base plate or member 72 that is suitably secured by any conventional means to the tire curing press 10 and it usually is operatively connected to the base plate or base supports 16 or 18 as required. Such base plate 72 has an outer tube 74 secured thereto as by a base ring 76 and cap screws 78 or equivalent. A first piston 80 is slidably received in the bore of the outer tube 74 and it is adapted to be moved axially of the outer tube 74 by liquid pressure supply means connecting though a suitable fitting 82 that extends through the base plate and such pressure fitting 82 is operatively connected to any controllable source of hydraulic pressure fluid for actuating the piston as hereinafter described. Clearance is provided for pressure fluid to reach to the piston 80.

A second or inner tube 84 is operatively secured to the inner face of the first piston 80 and extends axially of and beyond the end of the outer tube 74 in spaced relation thereto. However the inner tube 84 is sealed with relation to the outer tube 74 by a member which in this instance is called a top member 86 as if the apparatus were vertically positioned. And such inner tube 84 is suitably sealed in relation to this top member 86. the top member 86 is secured in any conventional manner to the upper end of the outer tube 74. A first pressure cylinder C1 is formed within the outer tube 74 between the base plate 72 and lower end of the first piston 80. Pressure liquid from the fitting 82 thus will move the first piston 80 and the inner tube upwardly.

At the upper end of the second or inner tube 84, a carrier block or attachment means 88 is provided and it is suitably sealed in relation to the inner tube 84 at its upper end. Additionally, the inner tube has a carrier block 88 secured to its upper end which tube extends through the top member 86. The members are all sealed in relationship to the tube 84 so that a second cylinder C2 is formed between the outer tube 74 and the inner tube 84 above the first piston 80. A suitable pressure inlet and fitting 90 is indicated in FIG. 6 and this is to supply pressure liquid to the second cylinder for moving the inner sleeve or tube 84 and the first piston downwardly of the outer tube whereby any member operatively secured to the carrier block 88 can have movement provided therefore in relation to its longitudinal position in relation to the bladder positioning member 70.

The next pressure operating portion of the bladder positioning member 70 includes a centerpost 92 that is secured to the first piston 80 and extends upwardly therefrom, with the centerpost being spaced from the wall of the second tube and extending therealong and protruding up through the carrier block 88 to have an exposed upper end. Thus, a third pressure cylinder C3 is provided in a portion of the carrier block and connecting to the bore formed between the outer periphery of the centerpost 92 and the inner periphery of the inner tube 84. This cylinder is provided with pressure liquid through a suitable connecting fitting indicated at 94 for causing downward movement of the centerpost 92 and anything operatively secured to the exposed upper end thereof. Of course, the centerpost is operatively sealed in relationship to the bore of the inner tube 84 and C3 can move the centerpost in relation to the first piston 80 and to the fixed position of the outer tube 74 whereby an upper end bead of a tire engaging bladder secured to the upper end of the post 92 can be moved in relation to a lower portion of the bladder. Pressure liquid can be supplied to a center tube 94 that extends through the base plate 72 by a supply means 95 which connects to an exposed lower end of the center tube 94. Such center tube 94 extends into and is spaced from a lower end bore 96 formed in centerpost 92. Liquid fed through the center tube is sealed within the bore of the inner tube 84 by seal rings 98 and 100 on the center post 92.

Reference is particularly made to the somewhat diagramatic showing of the improved tire press of the invention and its operational functioning as shown in FIG. 7A through 7D. Specifically, the tire engaging or inflation bladder 100 is shown and it has upper and lower beads 102 and 104 respectively. The bladder is used for forcing a tire carcass 106 out into engagement with the mold surfaces of the upper and lower mold sections 108 and 110, respectively.

The lower bead 104 of the bladder is operatively secured to the carrier block 88 while the upper bead 102 of the bladder is operatively secured to the top end of the centerpost.

Figure 7A:
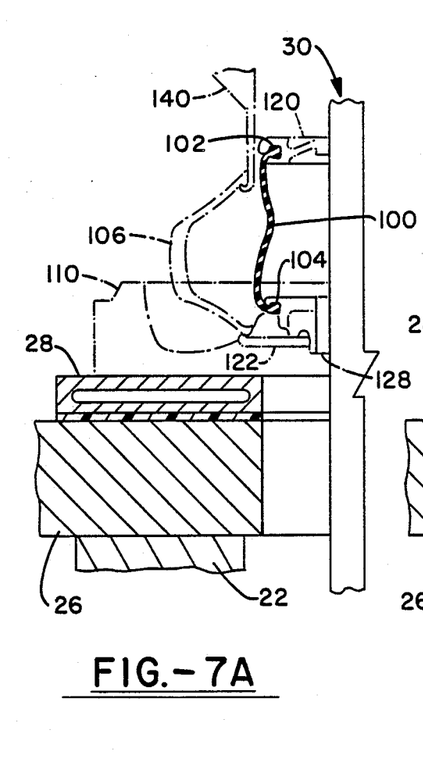
FIG. 7A is a fragmentary vertical section showing the tire curing press in its mold open position and with a green tire being lowered into engagement with the lower mold platen section, the tire bladder being in an extended position.
Figure 7B:
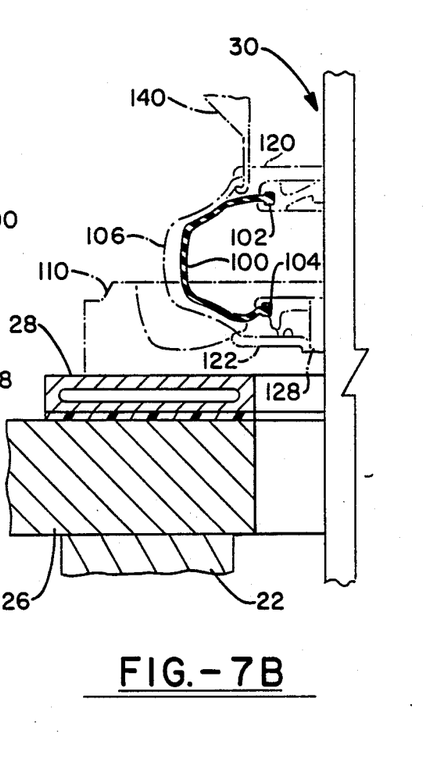
FIG. 7B is the next step in the tire curing process where the tire is being lowered into the lower mold section and the bladder is being moved down to more of a toroidal shape in section.
Figures 7C, 7D:
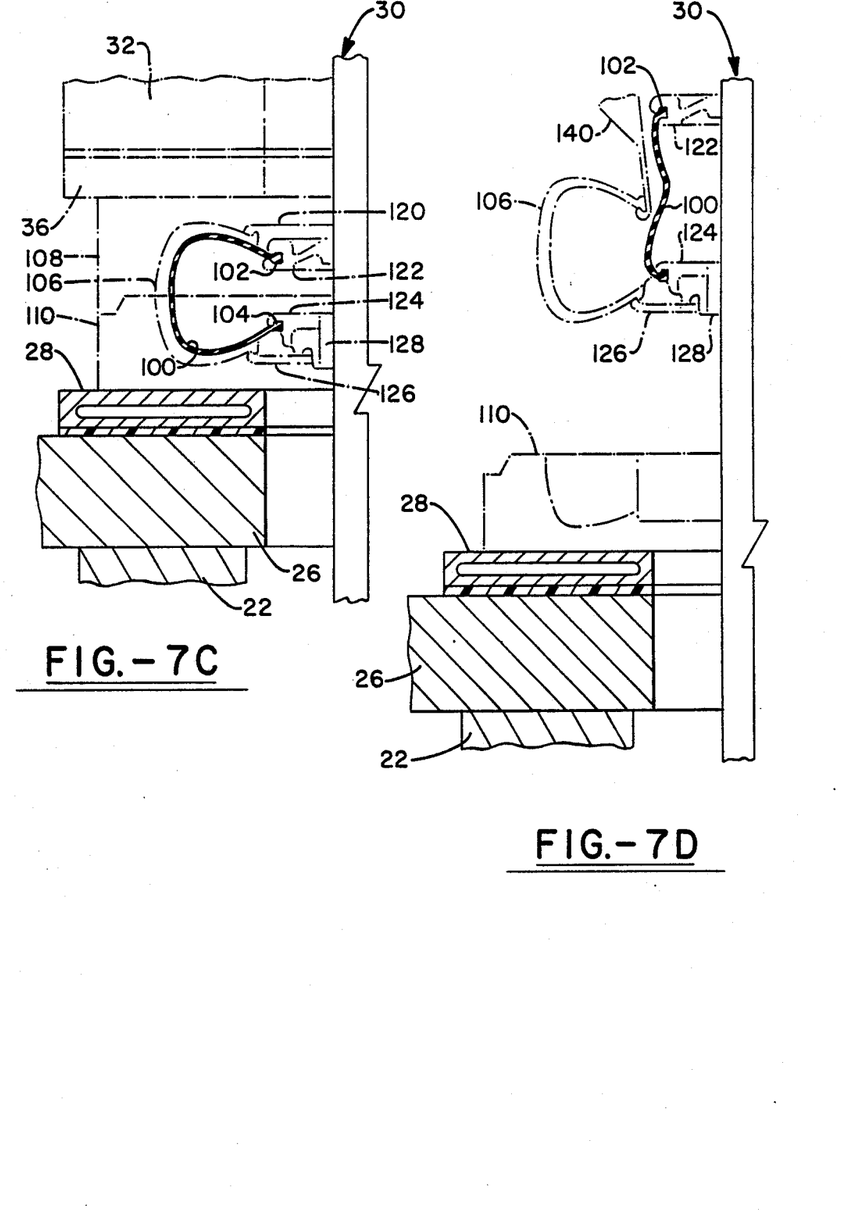
FIG. 7C is a fragmentary vertical section showing the next step in the tire curing process, wherein the tire carcass is in full engagement with the mold sections.
FIG. 7D is a fragmentary vertical section showing the position of the upper and lower bead engaging members where the tire bladder is in a tire release position wherein the tire has been stripped from the bladder and is ready to be lifted out of engagement with the tire mold assembly; the cured tire previously having been stripped from the lower mold section.

FIG. 7C is representative of the tire carcass 106 as it is in full engagement with the mold sections and normally steam is supplied to the interior of the bladder 100 to force the tire carcass tightly into the mold sections and to aid in the tire carcass clearing action. Such steam can be supplied to any conventional supply member such as a device that would connect to a suitable fitting and bore provided in the carrier block 88, that would supply steam to the interior of the bladder as positioned in the apparatus.

Upon the completion of the tire cure, it is necessary to break open the mold sections and this is done by releasing any mold lock means provided (not shown) and by releasing steam pressure within the bladder 100 and by supplying hydraulic pressure supply to the inlet 82 which raises the inner tube 84 and the carrier block 88 to start to strip the tire carcass from the lower mold.

Bladder Controls

The positioning and tire engaging actions of the bladder 100 have been shown in FIGS. 7A, 7B, 7C and 7D. Any suitable clamp rings 120 and 122 are secured to the upper bead of the bladder to affix it to the upper end of the centerpost 92. Likewise clamp members 124 and 126 engage the lower bead 104 to secure it to the carrier block 88.

A conventional fluid pressure and vacuum supply means connects to the interior of the bladder 100 as by a supply conduit 128 formed in the carrier block. Then by activation of the multi-piston and cylinder assembly 70 the bladder can be made substantially tubular for engaging a tire carcass 106 being fed to the tire press by a loader means (not shown). As the centerpost 92 is moved downwardly, and some pressure fluid may be supplied to the bladder, the tire carcass 106 and bladder become more of a toroidal shape in section. By bringing the mold sections into operative engagement by raising the lower mold platen, the upper platen 32 as shown in FIG. 1 is secured in a known position and this enables the mold sections to be closed for tire vulcanization.

After tire cure, closing pressure is removed from the piston 22 and the lower mold section drops slightly. The tire then is freed from the lower mold section by pressurizing the first piston 80 by fluid through fitting 82 to lift the centerpost and move it and the bladder 100 to the position shown in FIG. 7D. A tire unloader hook 140 engages the cured tire carcass for tire removal and it moves the carcass away from the press. Such action is permitted by raising the upper platen 32 by the cylinders 38 and 40 to tire release position.

The press of the invention will provide accurately sized tires and the objects of the invention are achieved by this novel press 10.

While in accordance with the patent statutes, a preferred embodiment and best mode has been presented, the scope of the invention is not limited thereto, but rather is measured by the scope of the attached claims.

What is claimed is:

1. A tire curing press comprising a pair of parallel upright support posts,
    an upper platen slidably mounted on said support posts,
    a lower platen slidably carried by said support posts, each of said platens having means to carry a mold section secured thereto,
    a base means associated with said support posts and secured thereto,
    pressure applying means operatively secured to said lower platen to move it upwardly and cause any mold section thereon to engage any mold section on said upper plate, and
    lock devices operatively engaging said support posts above said upper platen to prevent upward movement of said upper platen;
    wherein said base means has an upper end and said pressure applying means comprise an annular piston slidably mounted on said base means at said upper end thereof, said base means having an annular chamber therein receiving said annular piston and fluid pressure supply means connecting to said annular chamber to move said annular piston, and wherein said annular piston has a greater surface area than any tire to be cured, and means to apply the same pressure to actuate the annular piston as to the tire being cured, and
    wherein said support posts each have annular recesses therein at equal heights on said support posts from said base means, and said lock devices include lock members movable into and out of engagement with said annular recesses on said support posts to form a stop to limit upward movement of said upper platen.

2. A tire curing press as in claim 1 wherein support members position said base means on a floor, said base means and said lower platen each have a center aperture therein, and a fluid cylinder means is positioned in said center aperture and protrudes up from said base means and through said lower platen to be operatively associated with any molds carried by said platens.

3. A tire curing press comprising a pair of parallel upright support posts,
    an upper platen slidably mounted on said support posts,
    a lower platen slidably carried by said support posts, each of said platens having means to carry a mold section secured thereto,
    a base means associated with said support posts and secured thereto,
    pressure applying means operatively secured to said lower platen to move it upwardly and cause any mold section thereon to engage any mold section on said upper plate, and lock devices operatively engaging said support posts above said upper platen to prevent upward movement of said upper platen, wherein said base means has an upper end and said pressure applying means comprise an annular piston slidably mounted on said base means at said upper end thereof, said base means having an annular chamber therein receiving said annular piston and fluid pressure supply means connecting to said annular chamber to move said annular piston, and wherein said annular piston has a greater surface area than any tire to be cured, and means to apply the same pressure to actuate the annular piston as to the tire being cured.

4. A tire curing press comprising a pair of parallel upright support posts, an upper platen slidably mounted on said support posts, a lower platen slidably carried by said support posts, each of said platens having means to carry a mold section secured thereto, a base means associated with said support posts and secured thereto, pressure applying means operatively secured to said lower platen to move it upwardly and cause any mold section thereon to engage any mold section on said upper plate, and slide locks operatively engaging said support posts above said upper platen to prevent upward movement of said upper platen, wherein said support posts each have annular recesses therein at equal heights on said support posts from said base means, each slide lock comprising a pair of lock plates having arcuate edge recesses formed therein, a pair of parallel slide rods, said lock plates are carried by said slide rods with said edge recesses opposed and being positioned on opposite sides of said support posts, means for moving said lock plates into and out of engagement with said annular recesses on said support posts to form a stop to limit upward movement of said upper platen; and means for moving said upper platen to a position above said slide locks on said support post to facilitate loading tires into and unloading them from said mold sections, said mold sections secured thereto.

* * * * *